United States Patent
Hosokawa et al.

[11] Patent Number: 5,926,010
[45] Date of Patent: Jul. 20, 1999

[54] OVERCURRENT BREAKING CIRCUIT

[75] Inventors: Kiyoshi Hosokawa, Tokyo; Nobuhiro Imaizumi, Shizuoka, both of Japan

[73] Assignee: Yazaki Corporation, Tokyo, Japan

[21] Appl. No.: 09/005,797

[22] Filed: Jan. 12, 1998

[30] Foreign Application Priority Data

Jan. 13, 1997 [JP] Japan ................................ 9-003996

[51] Int. Cl.$^6$ ...................................................... G05F 1/10
[52] U.S. Cl. ............................................ 323/222; 323/908
[58] Field of Search ................................... 323/222, 908; 363/49; 361/28, 29, 205, 94

[56] References Cited

U.S. PATENT DOCUMENTS

| | | | |
|---|---|---|---|
| 3,775,675 | 11/1973 | Freeze et al. | 324/547 |
| 3,914,667 | 10/1975 | Waldron | 361/94 |
| 4,819,117 | 4/1989 | Brennan et al. | 361/18 |
| 5,710,690 | 1/1998 | Bontempo et al. | 361/94 |

FOREIGN PATENT DOCUMENTS

| | | | |
|---|---|---|---|
| 0 245 819 | 11/1987 | European Pat. Off. | H03K 17/08 |
| 1-301432 | 12/1989 | Japan | B60R 16/02 |

OTHER PUBLICATIONS

Patent Abstracts of Japan JP 1301432 (Hitachi) May 12, 1989.

*Primary Examiner*—Peter S. Wong
*Assistant Examiner*—Rajnikant B. Patel
*Attorney, Agent, or Firm*—Sughrue, Mion, Zinn, Macpeak & Seas, PLLC

[57] ABSTRACT

An overcurrent breaking circuit includes a semiconductor switch inserted in a main current path; a current detector circuit for detecting a current passing through the main current path; a logic circuit for switching off the semiconductor switch when the current detector circuit detects a current exceeding a set value for an overcurrent level; a first unit for prohibiting the logic circuit from performing an operation for switching off the semiconductor switch even if the current detector circuit detects a current exceeding the set value for a first short time period immediately after the semiconductor switch is switched from a breaking state to a conductive state; and a second unit for prohibiting the logic circuit from performing an operation for switching off the semiconductor switch for a second short time period even if the current detector circuit detects a current exceeding the set value when the semiconductor switch remains in a conductive state.

6 Claims, 4 Drawing Sheets

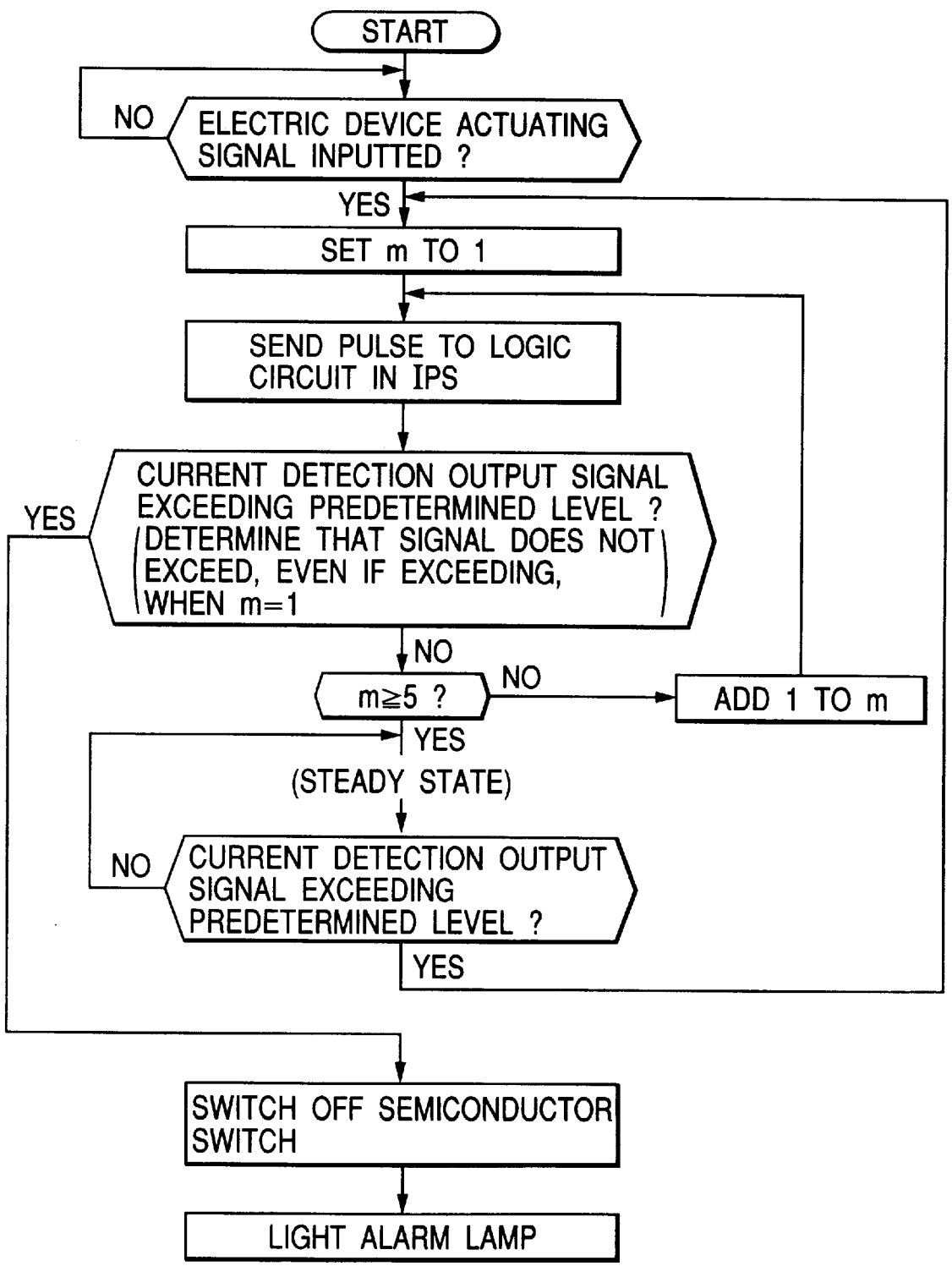

OVERCURRENT BREAKING CIRCUIT

BACKGROUND OF THE INVENTION

The present invention relates to an overcurrent breaking circuit for a direct current power supply. The present invention relates particularly to improvements in an overcurrent breaking circuit using an intelligent power switch (hereinafter referred to as "IPS" in this specification). While the present invention has been developed for use in a power supply circuit in an automotive vehicle, the present invention is not limited to automotive vehicles but may be widely utilized in other applications.

The IPS has been widely used in power supply circuits for electric devices in automotive vehicles. The IPS is an electric component which contains, in a single package, a semiconductor switch disposed in a main current path, a current detector circuit for detecting a current through the main current path, and a logic circuit for automatically switching off the semiconductor switch when an overcurrent is detected in an detected output of the current detector circuit. A prevalently used IPS has a rated current set at several amperes and an overcurrent breaking value set at several tens of amperes. The IPS has a function of detecting by itself an overcurrent in the main current path to break the main current path in response to its detection output. The built-in logic circuit is provided with an output terminal and an input terminal so that more complicated control may be performed utilizing the output terminal and the input terminal. More specifically, a CPU (microprocessor) may be externally provided separately from the IPS such that a signal from the output terminal is fetched into the CPU and a control signal is fed from the CPU to the input terminal to perform a variety of high level controls as well as to break the main current path in the event of the detection of an overcurrent.

As an example of the prior art, Japanese Patent Unexamined Publication No. Hei. 1-301432 describes a related technique. This technique, which is used in a control switch for an electric device for an automotive vehicle, fetches an output signal from a logic circuit into a CPU which processes the signal and supplies the processed signal to the logic circuit as an input signal to control the level of a detected overcurrent at two steps. Specifically, when a current is initially supplied to electric devices through manipulation from the driver's seat for starting an automotive vehicle in an inoperative state, a current may be detected temporarily in excess of a set overcurrent level due to a rotating machine and so on included in the electric devices which may cause a large rush current. However, since the rush current is a normal phenomenon which occurs for a short time period immediately after the current is conducted, and the current value on the main current path is converged to a steady value after the short time period has passed when the apparatus is operating normally. Thus, the control is performed such that the set overcurrent level is temporarily made higher for the short time period in which the rush current may be generated, and the set overcurrent level is changed to a lower value corresponding to a steady current after the rush current is converged. This prevents the main current path from being uselessly broken due to the detection of an overcurrent and simultaneously prevents an abnormal phenomenon from being passed by due to a uniformly set high overcurrent level.

The assigner of the present application and others have already manufactured and commercialized unit components or automotive vehicles employing a circuit which operates according to different principles from the circuit described in the foregoing document but has a similar object. More specifically, as illustrated in FIG. 1, an IPS is used on a main current path for supplying a direct current to electric devices to turn on an off a current therethrough, and an output signal from a logic circuit of the IPS is fetched into a CPU which applies a control signal processed thereby to the logic circuit as an input signal. The CPU is provided not only for controlling the IPS but also for controlling electrically controlled switches for an automotive vehicle, not shown in the figure, in a complicated and associated manner. In this circuit, a control is performed such that during a time period in which a rush current may be generated due to an electric device, a semiconductor switch internal to the IPS is repetitively turned on and off at a high rate to prevent a current flowing through a main current path from substantially exceeding a set overcurrent level.

The overcurrent breaking circuit shown as a prior art example as described above has experienced the following problem. Some electric devices supplied with a current through the IPS have a large capacitive load. A specific example of such electric devices is a compressor motor for a freezer installed in a freezer car. While a compressor motor per se is not a capacitive load, a noise preventive capacitor having a large capacitance is connected to a power supply circuit to prevent noise from introducing into a radio receiver and a computer unit installed in the same car through the power supply circuit to adversely affect these components. In addition, the compressor motor for a freezer is independently turned on and off in response to a detected temperature within the freezing room, in principle, irrespective of the power supply for the respective components which is turned on and off in association with the running of the car.

Thus, even if protective measures are taken so as not to execute emergency processing in response to a detected current exceeding an overcurrent level particularly set for a rush current possibly generated immediately after a current is supplied to electric devices when an automotive vehicle is started, as described in connection with the prior art example, since a freezer relies on its own temperature control to automatically turn on and automatically turn off during a We steady running of the vehicle, the freezer turning on causes a large current to flow for a short time period, resulting in detecting a current exceeding the overcurrent level which is set to monitor a steady state. Since this is a normal phenomenon, it is not necessary to execute operations for breaking the main current path or for generating an alarm, by the assumption that a fault has occurred, from the current exceeding the overcurrent level.

SUMMARY OF THE INVENTION

The present invention has been made in view of the above described circumstances, and its object is to provide an overcurrent breaking circuit which does not determine a fault even if an overcurrent state occurs for a short time period (a second short time period $t_2$) when a normal driving state is continuing, in addition to a protective circuit which does not determine a fault even if an overcurrent is generated during a short time period (a first short time period $t_1$) immediately after a supply current is initially supplied to a load. It is another object of the present invention to provide an overcurrent breaking circuit which does not detect a fault based on normal operations of electric devices to break a current of a main current path or to generate an alarm. It is a further object of the present invention to provide an overcurrent breaking circuit which is suitable for use in a power supply circuit for an apparatus having a large capacitive load circuit. It is a further object of the present invention to provide an overcurrent breaking circuit which is useful as a power supply circuit for an automotive vehicle equipped with electric devices having a large load.

The present invention provides an overcurrent breaking circuit which comprises a semiconductor switch inserted in a main current path, a current detector circuit for detecting a current passing through the main current path, and a logic circuit for switching off the semiconductor switch when the current detector circuit detects a current exceeding a predetermined current, and further comprises first means for prohibiting the logic circuit from performing an operation for switching off the semiconductor switch even if the current detector circuit detects a current exceeding the predetermined current for a first short time period immediately after the semiconductor switch is switched from a breaking state to a conductive state, wherein the overcurrent breaking circuit is characterized by comprising second means for prohibiting the logic circuit from performing an operation for switching off the semiconductor switch for a second short time period even if the current detector circuit detects a current exceeding the predetermined current when the semiconductor switch remains in a conductive state for a sufficiently long time period.

With the configuration mentioned above, even if an overcurrent is detected for the first short time period immediately after a current is initially supplied, due to a rush current generated by a normal electric device when, for example, an inoperative automotive vehicle is started, this overcurrent is not determined as a fault. In addition, even if an overcurrent is detected for the second short time period due to a normal phenomenon (for example, the starting of a freezer or the like) while a current is being supplied in a steady state, this overcurrent is not determined as a fault, thereby making it possible to avoid breaking the current passing through the main current pass or generating an alarm.

The second means (the means for preventing an initial current of a freezer or the like generated during a steady state from being regarded as a fault) may be implemented by the same configuration as the first means (the means for preventing a normal rush current from being regarded as a fault) to detect a temporary overcurrent in a steady state. Thus, the same configuration may be used repetitively for the second means as well as for the first means. Alternatively, the second means may be provided separately from the first means by setting different parameters. When different parameters are set for the second parameters, more advanced processing can be provided.

The semiconductor switch, the current detector circuit, and the logic circuit may be provided by using a component which is integrally formed as an intelligent power switch, and the first means and the second means for prohibiting an operation for switching off the semiconductor switch may be provided as software for a control circuit (CPU) which fetches an output from the logic circuit in the IPS and applies an input to the logic circuit.

The first means may be configured to repetitively apply the logic circuit with an interruption signal for the semiconductor switch "m" times (2 to 10 times) for the first short time period $t_1$ (several milliseconds to several tens of milliseconds), and the second means may be configured to repetitively apply the logic circuit with an interruption signal for the semiconductor switch "n" times (2 to 10 times for the second short time period $t_2$ (several milliseconds to several tens of milliseconds).

The first means may be configured to ignore a current value, even if exceeding the predetermined current, at least at the first time of "m" repetitions of the interruption signal, and the second means may be configured to ignore a current value, even if exceeding the predetermined current, at least at the first time of "n" repetitions of the interruption signal.

The first short time period $t_1$, the second short time period $t_2$, and the numbers "m" and "n" which is the number of times the interruption signal is applied, may be set to $t_1=t_2$, and m=n or m>n to effectively avoid uselessly breaking a current passing through the main current path or generating an alarm, due to a temporary overcurrent possibly generated in a normal operation of an electric device.

BRIEF DESCRIPTION OF THE DRAWINGS

FIG. 4 is a flow chart illustrating the flow of operations in a second embodiment of the present invention.

DETAILED DESCRIPTION OF THE INVENTION

Preferred embodiments of the present invention will now be described with reference to the accompanying drawings.
(First Embodiment)

Figure 1:
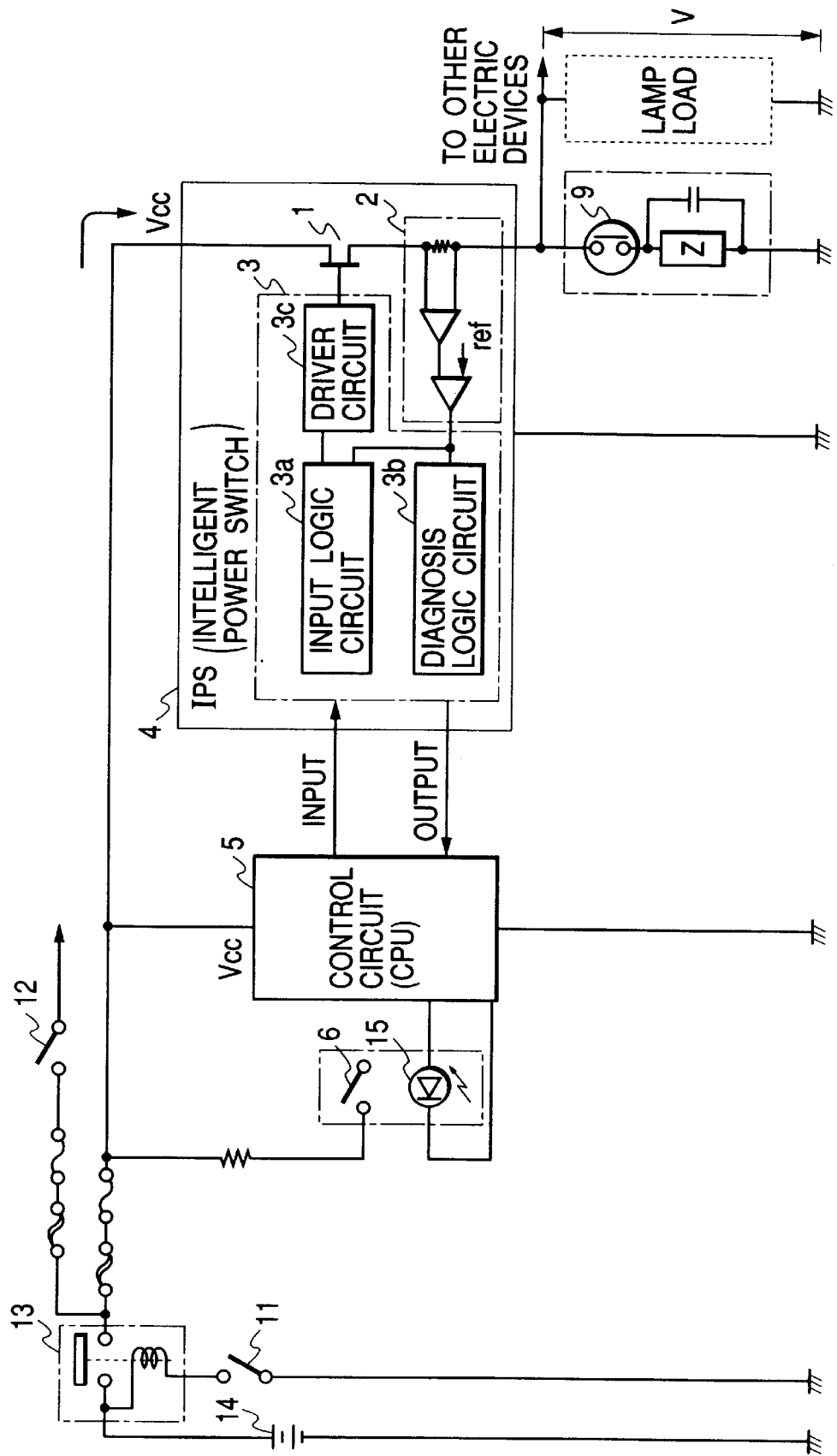
FIG. 1 is a block diagram illustrating the configuration of a main portion in a first embodiment of the present invention and a prior art example.

FIG. 1 is a block diagram illustrating the configuration of a main portion of a circuit according to a first embodiment of the present invention. Since the first embodiment is implemented by software of a control circuit (CPU), its hardware configuration is similar to the configuration of the aforementioned prior art example.

The circuit according to the first embodiment of the present invention comprises a semiconductor switch 1 inserted in a main current path; a current detector circuit 2 for detecting a current passing through the main current path; and a logic circuit 3 for switching off the semiconductor switch 1 when the current detector circuit 2 detects a current exceeding a predetermined current. A control circuit 5 is provided with a first means, in the form of software, for prohibiting an operation for switching off the semiconductor switch 1 even if the current detector circuit 2 detects a current exceeding the predetermined current within a first short time period $t_1$ immediately after the semiconductor switch 1 is switched from a breaking state to a conductive state, and with a second means constituting a feature of the present invention, in the form of software, for prohibiting an operation for switching off the semiconductor switch 1 for a second short time period $t_2$ even if the current detector circuit 2 detects a current exceeding the predetermined current after the semiconductor switch 1 has remained in a conductive state for a sufficient time period.

As the hardware configuration, the semiconductor switch 1, the current detector circuit 2 and the logic circuit 3 are included in an integrally formed IPS (intelligent power switch) 4. The foregoing first means and second means are included in the control circuit (CPU) 5 which fetches an output of the logic circuit 3 of the IPS and applies an input to the logic circuit 3.

More specifically, the first means in the control circuit 5 includes a means for repetitively providing the logic circuit 3 with an interruption signal for the semiconductor switch 1 "m" times ("m" is in a range of approximately 2 to 10) for the first short time period $t_1$ ($t_1$ is in a range of several milliseconds to several tens of milliseconds), while the second means includes a means for repetitively providing the logic circuit 3 with an interruption signal for the semiconductor switch 1 "n" times ("n" is in a range of approximately 2 to 10) for the second short time period $t_2$ ($t_2$ is in a range of several milliseconds to several tens of milliseconds).

The first means further includes a means for ignoring at least the first current value exceeding the predetermined current, if detected, within the "m" repetitions of the interruption signal, and the second means further includes a means for ignoring at least the first current value exceeding the predetermined current, if detected, within the "n" repetitions of the interruption signal.

The first short time period $t_1$ and the second short time period $t_2$, as well as the number "m" and "n" which is the number of times the interruption signal is applied, are set in the following relationships:

$t_1 = t_2$
$m > n$

The logic circuit 3 includes an input logic circuit 3a for receiving an output signal from the control circuit 5, a diagnosis logic circuit 3b for outputting a diagnosis result to the control circuit 5, and a driver circuit 3c.

Figure 2:
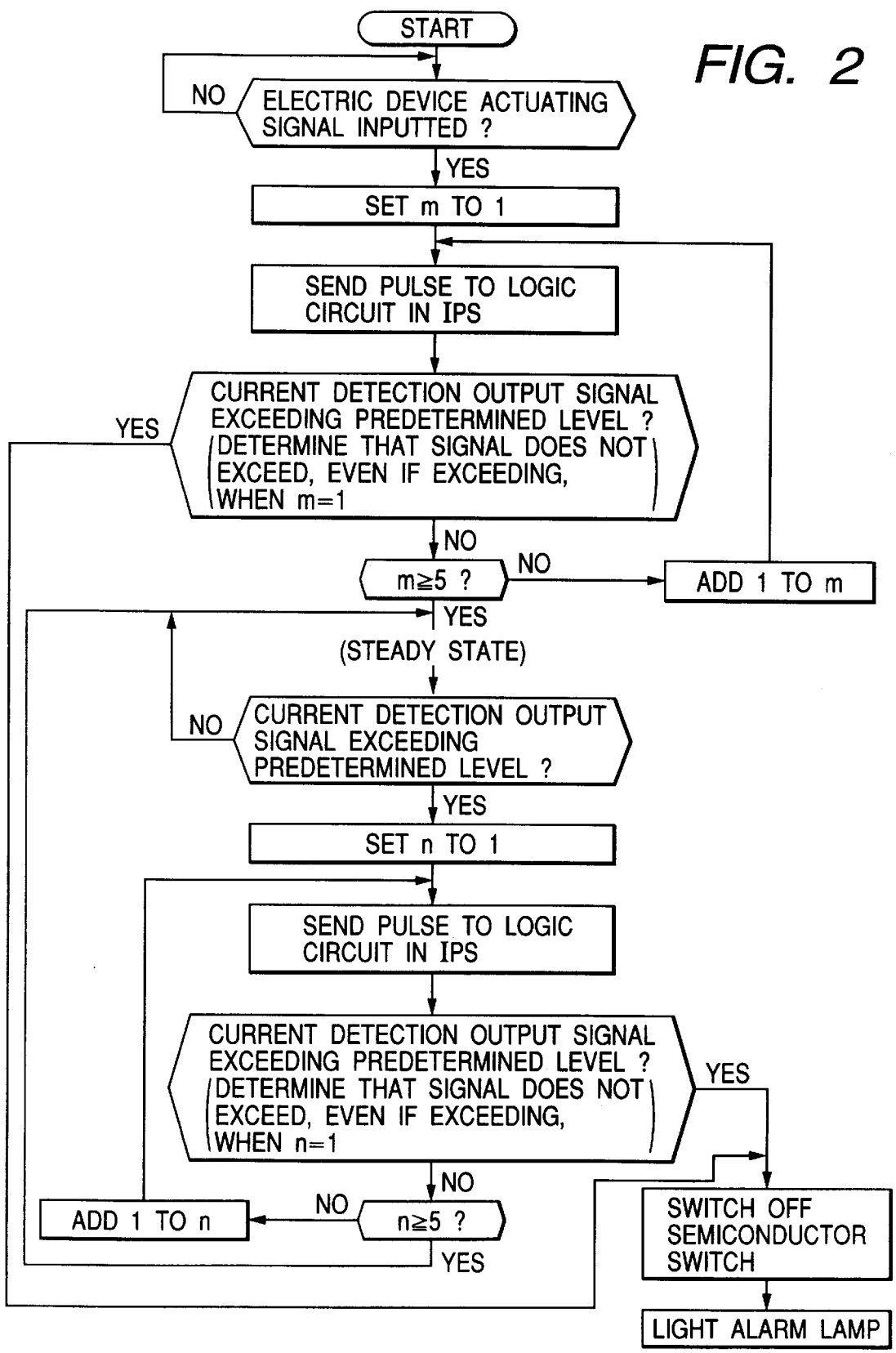
FIG. 2 is a flow chart illustrating the flow of operations in the first embodiment of the present invention.

Next, the operation of the circuit according to the first embodiment of the present invention will be described. FIG. 2 is a flow chart for explaining a main portion of the operation executed by the control circuit 5 in the circuit according to the first embodiment of the present invention, and FIGS. 3(a) to 3(c) are diagrams illustrating operation timing, a current waveform and a voltage waveform in the first embodiment of the present invention, respectively.

Figures 3A, 3B, 3C:
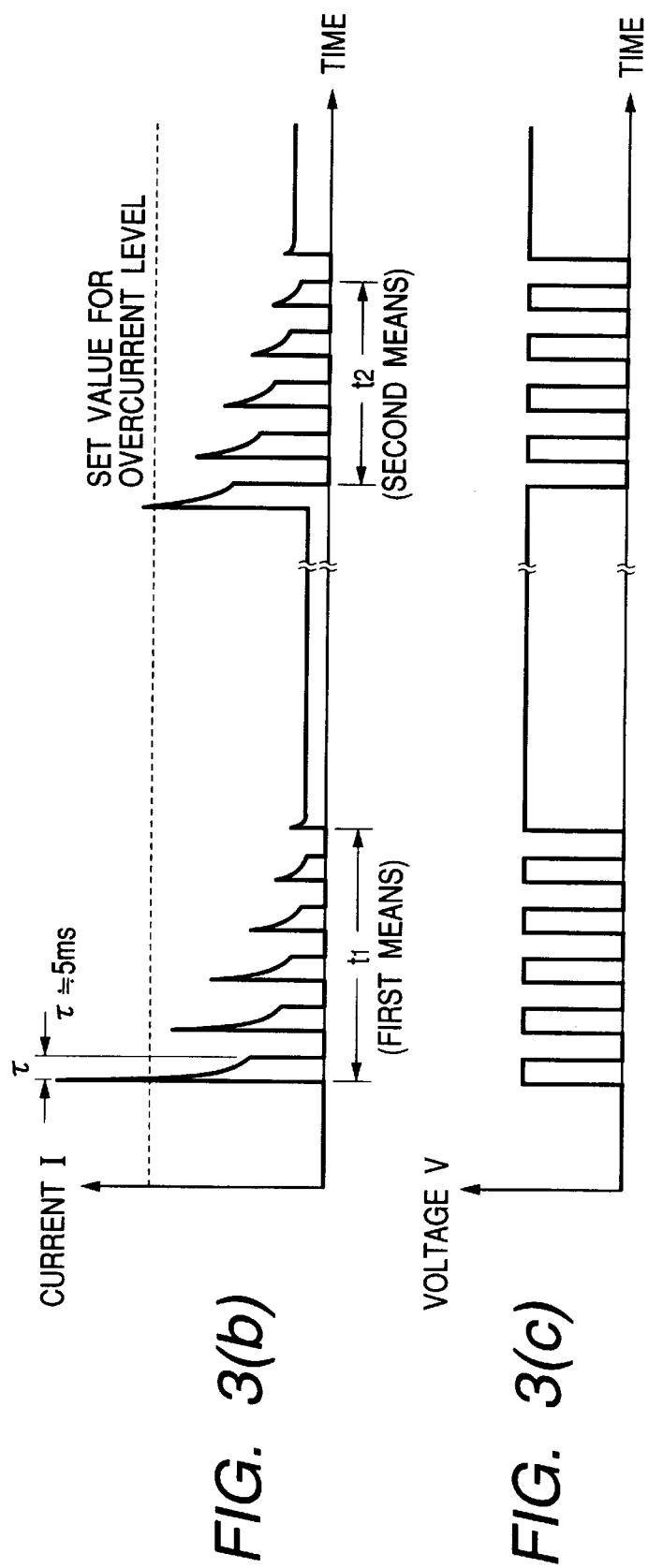
FIGS. 3(a), 3(b) and 3(c) are charts illustrating a timing chart, a current waveform and a voltage waveform in the first embodiment of the present invention, respectively.

FIGS. 3(a) to 3(c) commonly have the abscissa representing the time axis, wherein FIG. 3(a) illustrates the operation timing of a switch 6 for actuating an electric device and a freezer switch 9; FIG. 3(b) illustrates a current I through the main current path; and FIG. 3(c) illustrates a voltage V at a load. First, an operator switches on a battery switch 11, and then switches on a key switch 12 which is connected to a battery 14 (24 V) through a battery relay 13. This operation is not included in FIGS. 3(a) to 3(c), and the time axis of FIGS. 3(a) to 3(c) begins when the switch 6 for actuating an electric device is switched on. The switch 6 for actuating an electric device is manually switched on at time T1 indicated in a left portion of FIG. 3(a). Incidentally, a load drive IPS operation indicator lamp 15 (LED) is connected to the control circuit 5. The first means operates for the short time period $t_1$ following the time T1, and a stable steady state is entered after the operation of the first means. Then, the freezer switch 9 is suddenly switched on by the action of an automatic temperature switch at time T2. The second means operates for the short time period $t_2$ following the time T2. After this operation is completed, the stable steady state is again entered. A sequence of the foregoing operations will be described along the time axis with further reference to FIGS. 3(a) to 3(c).

The control circuit 5 sends a control signal to the input of the IPS (intelligent power switch) 4 in response to the switch 6 for actuating an electric device manipulated by the operator. More specifically, the control circuit 5 sends a pulse signal to the logic circuit 3 in the IPS 4 with the value of the number of times "m" being set to one for the interruption signal for the semiconductor switch 1. The logic circuit 3, in response to the pulse signal, controls the semiconductor switch 1 through the driver circuit 3 to set the semiconductor switch 1 into a conductive state. This causes the current to flow through the main current circuit. The current detector circuit 2 detects this current passing through the main current path. Since this current corresponds to a rush current generated by a number of apparatuses connected to a load, this current will exceed a value (the value indicated by a broken line in FIG. 3(b)) set for an overcurrent level. The logic circuit 3, upon detecting this overcurrent, immediately controls the semiconductor circuit 1 to break the current passing through the main current path. The time period during these operations is represented by $\tau$ (which lasts approximately five milliseconds in the circuit of the embodiment).

The logic circuit 3 notifies the control circuit (CPU) 5 of this state from an output path. The control circuit 5, however, ignores this notification since "m" is now set to one, and again sends a pulse signal to the logic circuit 3 in the IPS 4 with the value of "m" being set to two. This causes a current to again flow through the main current path, however, this current is broken in a short time period by the control. Then, the control circuit 5 again sends a pulse signal to the logic circuit 3 in the IPS 4 with the value of "m" being set to three. A current flows through the main current path. This operation is repeated until "m" is set to five, and if the value of the current through the main current path does not exceed the set value for the overcurrent level while the operation is repeated five times, the semiconductor switch 1 is controlled to be continuously conductive. This is the operation of the first means performed for the short time period $t_1$. The voltage V at the load varies as a rectangular wave for the time period $t_1$ as illustrated in FIG. 3(c).

It should be noted that FIGS. 3(a) to 3(c) illustrate waveforms exclusively in a normal state. If a fault such as short-circuiting occurs in a load, the current value will still exceed the set value for the overcurrent level even if the value of "m" is two or more, so that an alarm is generated in the cabinet to notify the driver of the fault, and the semiconductor switch 1 is subsequently switched off to stop supplying the current to the load. In this way, even if a current temporarily exceeding the overcurrent level flows through the main current path, this is a normal state, so that the control circuit 5 avoids immediately generating an alarm and interrupting the current supplied to the load.

In this way, after the short time period $t_1$ has passed from the time T1, a steady-state operation is entered. Then, assume that a freezer, one of electric devices having a large load, is started under temperature control suddenly at time T2 while the steady-state operation is being performed. Now, the characteristic portion of the present invention begins from this point. Even if the freezer remains currently in a normal state without fault, the starting of the freezer causes an overcurrent to temporarily flow for charging a noise protective capacitor connected to a power supply circuit of the freezer. The control circuit 5 is not previously aware that the freezer will start. This situation is illustrated in a right portion of FIG. 3(b).

More specifically, when the freezer is turned on by an automatic switch, the control circuit 5 detects this through the current detector circuit 2 and the logic circuit 3. Simultaneously, the logic circuit 3 switches off the semiconductor switch 1 since a current level at this time exceeds the set value for the overcurrent level. The aforementioned exemplary prior art apparatus would execute an operation for detecting an overcurrent, whereas the circuit according to the present invention treats this as a normal operation. The control circuit 5 starts the second means to set the value "n" indicative of the number of times to one and interrupt the semiconductor switch 1 "n" times (four in this example) while "n" is incremented by +1. If no current exceeding the set value for the overcurrent level is detected meanwhile, this event is regarded as normal and the execution of the second means is terminated, followed by resuming a stable power supply state.

Assuming that the freezer fails due to short-circuiting or overloading even if the freezer switch 9 is normally operating at time T2, or that a circuit in the load fails due to short-circuiting or the like at time T2, an interruption current would exceed the set value for the overcurrent level for the subsequent time period $t_2$, in which case fault processing would be executed for generating an alarm, for breaking the main current path, and so on.

According to the circuit of the present invention as described above, even if a current through the main current path temporarily becomes larger due to an operation on the load side, which is not previously known to the control circuit 5, it is possible to continuously supply a stable current without executing any fault processing such as the generation of an alarm, if this is within a normal range.

(Second Embodiment)

A second embodiment of the present invention is equal in hardware configuration to the first embodiment illustrated in FIG. 1. FIG. 4 is a flow chart illustrating the flow of operations in the second embodiment of the present invention. The second embodiment likewise interrupts a main current path against a temporary increase in current passing through the main current path, generated when a stable operation is continuing. In this operation, the second means employs the same logic as the first means. Associated operational waveform charts are omitted.

Specifically explaining, a control circuit 5, upon receiving an electric device actuating signal in response to a manipulation on a switch 6 for actuating an electric device, sends a pulse signal to a logic circuit 3 in an IPS 4 while setting one to the value for "m" which is the number of times an interruption signal is applied for the semiconductor switch 1. A current detector circuit 2 of the logic circuit 3 detects the value of a current passing through the main current path, and sends a current detection output signal to the control circuit 5. The control circuit 5 fetches this output signal and determines whether or not a detected current value exceeds a set value for an overcurrent level. This interruption is repeated "m" times. Even if the value of the current through the main current path exceeds the overcurrent level, this is determined to be normal only at the first time within the "m" interruptions. However, if the value of the current through the main current path exceeds the overcurrent level at the second and subsequent times within the "m" interruptions, a fault operation is executed to generate an alarm and set the semiconductor switch 1 into a breaking state.

Next, if an apparatus connected to a load suddenly switches on, without previously notifying the control circuit 5, after a stable operation is entered, the second means is executed as is the case of the first embodiment. In the second embodiment, the second means also utilizes repetitively the same software as the first means which is executed upon powering on the apparatus. In other words, the interruption of the main current path is repeated by the second means, where the number of times "m" of the interruptions is equal to the first means. Unless the set value for the overcurrent level is exceeded at the second and subsequent times within the "m" interruptions except for the first time, this is regarded as a normal state, and the stable operation is resumed. If the set value for the overcurrent level is exceeded again at the second and subsequent times within the "m" interruptions, a fault operation is executed.

As described above, according to the present invention, even if a temporary overcurrent is generated on the load side without previously notifying the control circuit, as is the case of initially supplying a current to an electric device through manipulations, this is ignored as long as this is within a normal operation range, thereby making it possible to avoid breaking a current on the main current path and uselessly generating an alarm. Thus, it is possible to prevent a temporary overload from being treated as a fault even if a connected apparatus, such as an electric device for temperature control or the like, turns on and off for reasons of the load side.

The present invention is effectively used in a power supply circuit having a large capacitive load circuit.

What is claimed is:

1. An overcurrent breaking circuit comprising:

a semiconductor switch inserted in a main current path;

a current detector circuit for detecting a current passing through said main current path;

a logic circuit for switching off said semiconductor when said current detector circuit detects a current exceeding a set value for an overcurrent level;

first means for prohibiting said logic circuit from performing an operation for switching off said semiconductor switch if said current detector circuit detects a current exceeding the set value for the overcurrent level for a first short time period $t_1$ immediately after said semiconductor switch is switched from a breaking state to a conductive state; and second means for prohibiting said logic circuit from performing an operation for switching off said semiconductor switch for a second short time period $t_2$ if said current detector circuit detects a current exceeding the set value for the overcurrent value when said semiconductor switch is in a continuous conductive state.

2. An overcurrent breaking circuit according to claim 1, wherein said semiconductor switch, said current detector circuit, and said logic circuit are included in an integrally formed intelligent power switch, and said first means and said second means are included in a control circuit which fetches an output from said logic circuit of said intelligent power switch and applies an input to said logic circuit.

3. An overcurrent breaking circuit according to claim 2, wherein:

said first means includes means for repetitively applying said logic circuit with an interruption signal for said semiconductor switch m times (m is an integer equal to or more than two) for said first short time period; and said second means includes means for repetitively applying said logic circuit with an interruption signal for said semiconductor switch n times (n is an integer equal to or more than two) for said second short time period.

4. An overcurrent breaking circuit according to claim 3, wherein:

said first means includes means for ignoring a current value, even if exceeding the set value for the overcurrent level, at least at the first time of m repetitions of the interruption signal; and said second means includes means for ignoring a current value, even if exceeding said predetermined current, at least at the first time of n repetitions of the interruption signal.

5. An overcurrent breaking circuit according to claim 3, wherein $t_1 = t_2$, and m=n.

6. An overcurrent breaking circuit according to claim 3, wherein m>n.

* * * * *